(12) United States Patent
Black

(10) Patent No.: US 6,443,467 B1
(45) Date of Patent: Sep. 3, 2002

(54) BABY STROLLER WITH INTERCHANGEABLE FRONT WHEEL SUPPORT STRUCTURES

(75) Inventor: David A. Black, Montesano, WA (US)

(73) Assignee: Racing Strollers, Inc., Yakima, WA (US)

( * ) Notice: Subject to any disclaimer, the term of this patent is extended or adjusted under 35 U.S.C. 154(b) by 0 days.

(21) Appl. No.: 09/667,490

(22) Filed: Sep. 22, 2000

(51) Int. Cl.⁷ .................................................. B62B 7/00
(52) U.S. Cl. ..................................... 280/47.38; 280/643
(58) Field of Search ........................... 280/47.18, 47.38, 280/62, 642, 643, 647, 650, 653; 301/111, 113, 111.01, 111.05, 111.06

(56) References Cited

U.S. PATENT DOCUMENTS

| | | | | |
|---|---|---|---|---|
| 1,560,802 A | * | 11/1925 | Julstedt | 280/47.18 |
| 5,076,579 A | * | 12/1991 | Lockett et al. | 280/643 |
| 5,123,670 A | * | 6/1992 | Chen | 280/47.38 |
| 5,188,389 A | * | 2/1993 | Baechler et al. | 301/111 |
| 5,224,720 A | * | 7/1993 | Chaw et al. | 280/47.38 |
| 5,301,963 A | * | 4/1994 | Chen | 280/643 |
| 5,476,275 A | | 12/1995 | Baechler et al. | 280/47.38 |
| 5,669,624 A | * | 9/1997 | Eichhorn | 280/642 |
| 5,695,208 A | * | 12/1997 | Baechler et al. | 301/111 |
| 6,017,051 A | * | 1/2000 | Thimmig | 280/650 |
| 6,036,220 A | * | 3/2000 | Zhen | 280/62 |

\* cited by examiner

*Primary Examiner*—J. J. Swann
*Assistant Examiner*—Christopher Bottorff
(74) *Attorney, Agent, or Firm*—Seed Intellectual Property Law Group PLLC

(57) ABSTRACT

A baby stroller with a plurality of interchangeable front wheel support structures. The plurality of interchangeable front wheel support structures includes one swivel structure and one parallel shaft structure. In addition, the interchangeable wheel support structures also include different wheels configured for use on different terrain types.

13 Claims, 4 Drawing Sheets

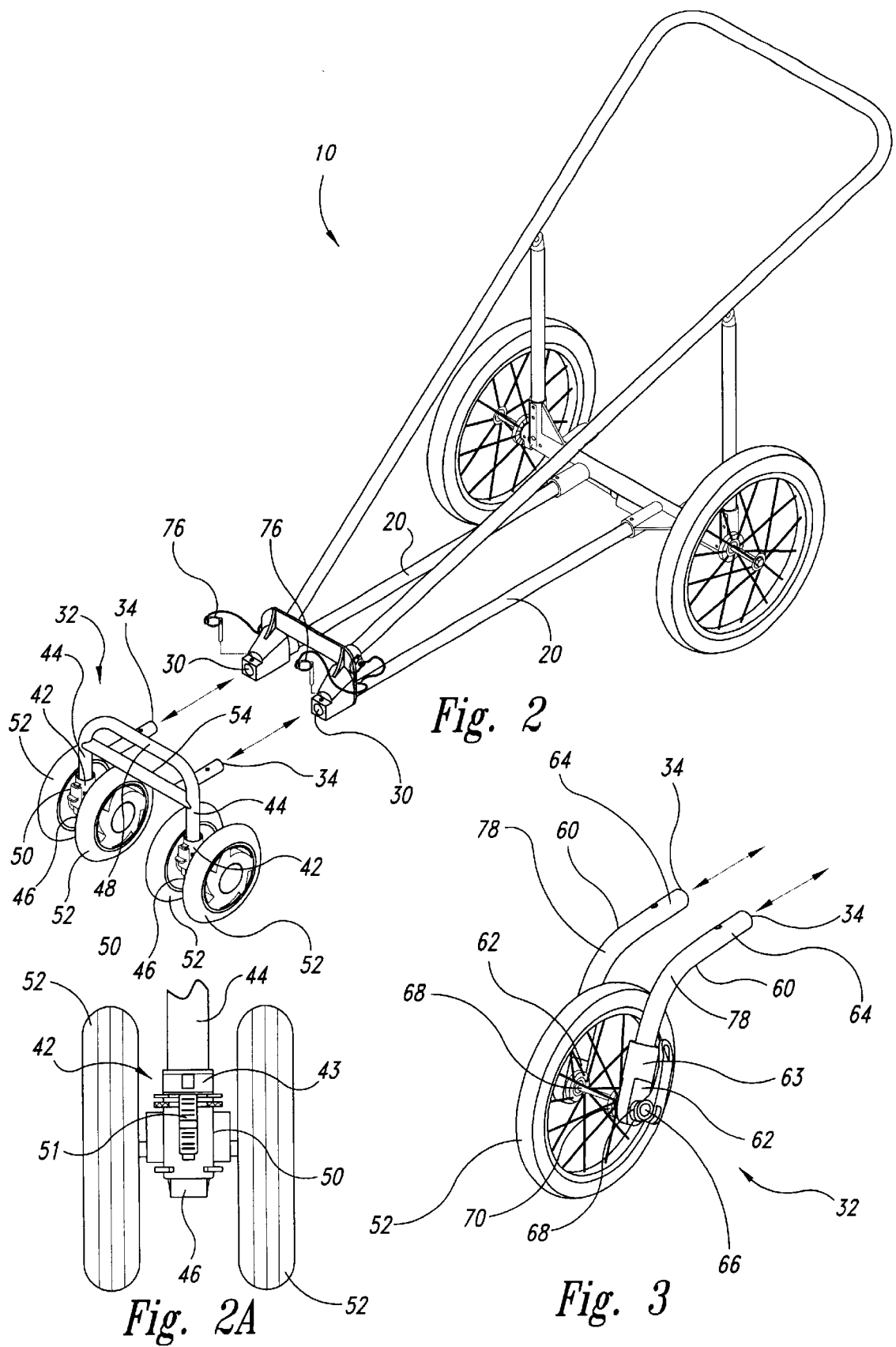

BABY STROLLER WITH INTERCHANGEABLE FRONT WHEEL SUPPORT STRUCTURES

TECHNICAL FIELD

The present invention relates to baby strollers, and more particularly to baby strollers for various terrains.

BACKGROUND OF THE INVENTION

Traditionally, baby strollers have been used to push an infant slowly on a relatively hard, smooth floor or sidewalk. As a result, the strollers were made small and light. These strollers work well enough at slow speed, but are extremely unwieldy and even dangerous on rough surfaces or at higher speeds.

As parents have become more health conscious in recent times, jogging and fast walking has become a popular pastime. Because baby strollers were not designed to be operated at high speed or on rough terrain, parents could jog or fast walk only when another person was available to babysit. As any parent knows, it is not always easy to find babysitters, so the ability of the parent to stay in shape by jogging or fast walking was severely limited.

Even for non-jogging parents, the need for an improved baby stroller has been apparent. The small, plastic wheels customarily used for the baby strollers are almost useless when it is desired to walk with an infant in a grassy park or on a rough road or sidewalk. Parents end up not walking with the infant at all or only walking in limited areas.

Recently, all-terrain baby strollers have been designed to overcome these problems. These strollers typically employ much larger wheels, often large bicycle tires. The stroller frame and frame connections are constructed to be stronger and larger to handle the heavy duty use they may receive. It is now quite common to see a parent pushing an infant while jogging, fast walking or even just slow walking in grassy, bumpy areas or over other rough terrain. However, there are drawbacks to these types of strollers.

Although the all-terrain baby strollers are suitable for use over varying terrain types, they are not optimized for each terrain type they encounter. For example, larger bicycle-type wheels on the front of the stroller may be optimal for rough terrain, especially when travel is at higher speeds, such as when a parent is jogging, but those wheels are not optimal for slow speed operation on smooth surfaces when a tight turning radius is desirable, such as in the aisles of a supermarket.

SUMMARY OF INVENTION

The present invention resides in a portable baby stroller and an interchangeable front wheel support structure therefore. The baby stroller is comprised of a frame with an attachment member. There is at least one rear wheel rotatably mounted to the frame, and there are a plurality of interchangeable front wheel support structures. Each of the front wheel support structures include at last one front wheel which is rotatably attached to the structure. Also, each front wheel structure has an attachment member configured to releasably attach to the frame attachment member.

The plurality of interchangeable front wheel support structures include different wheel configurations. The first and second structures have alternative front wheel configurations selectable for particular terrain over which the baby stroller is to be used.

In one preferred embodiment, the baby stroller frame has a bottom left member and a bottom right member. The members are spaced apart relative to one another but symmetrically positioned. There are a plurality of interchangeable front wheel support structures, each having a left mating portion and a right mating portion. The mating portions are spaced apart in relation to the front ends of the left and right bottom frame members so that the left mating portion is aligned with the front end of the left frame member and the right mating portion is aligned with the front end of the right frame member. Each mating portion is configured for insertion within the corresponding frame member and retention therein during use of the baby stroller.

In the particular preferred embodiment described above, the plurality of front wheel support structures, and the wheels attached thereto, includes different configurations. Among these configurations there is at least one swivel assembly having at least one wheel rotatably attached to the swivel assembly. The swivel assembly is configured to permit the wheel to swivel about an axis transverse to the axis of rotation of the wheel. Another configuration maintains a front wheel in static alignment with the rear wheels of the baby stroller. The wheel of this configuration is larger in diameter than the wheel of the swivel assembly.

Other features and advantages of the invention will become apparent from the following detailed description, taken in conjunction with the accompanying drawings.

BRIEF DESCRIPTION OF THE DRAWINGS

FIG. 2 is an isometric view of the baby stroller of FIG. 1 showing the dual swivel assembly structure detached from the baby stroller frame.

FIG. 2a is an enlarged, front elevational view of one of the swivel assemblies of the dual swivel assembly structure of FIG. 2.

FIG. 3 is an isometric view of another of the plurality of front wheel support structures of the invention, a single wheel assembly.

DETAILED DESCRIPTION OF THE INVENTION

The present invention is directed toward a baby stroller with interchangeable front wheel structures. Specific details of certain embodiments of the invention are set forth in the following description and in FIGS. 1–5 to provide a thorough understanding of such embodiments. One skilled in the art, however, will understand that the present invention may have additional embodiments, or that the invention may be practiced without several of the details described in the following description.

Figure 1:
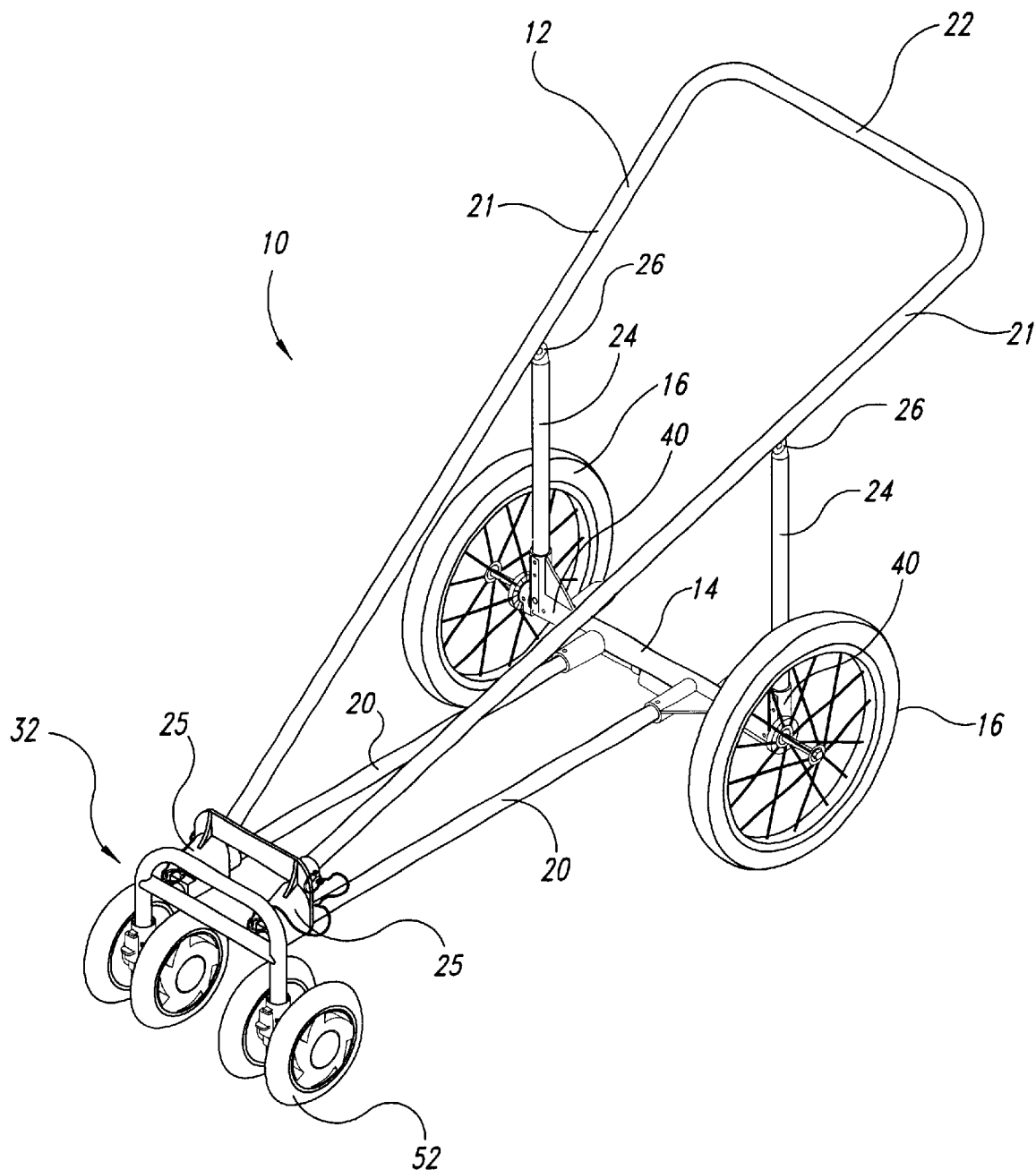
FIG. 1 is an isometric view of a baby stroller embodying the present invention but without a seat being shown and with one of a plurality of front wheel support structures being attached to the baby stroller frame, a dual swivel assembly.

As shown in the drawings for purposes of illustration, and as best seen in FIG. 1, the illustrated embodiment of the present invention is an all terrain baby stroller 10 having a foldable frame 12 and a transversely extending rear axle assembly 14 designed to permit folding of the frame and selective removal of the two rear wheels 16 rotatably mounted to the rear axle assembly. The forward end of the frame 12 is attached to one of a plurality of interchangeable front wheel support structures 32. The support structure has at least one front wheel 52 rotatably mounted thereto. In the illustrated stroller 10, the frame 12 includes left and right side horizontal base frame tubes 20 extending rearwardly from the front wheel support structure 32, in parallel spaced-apart relation to each other, to the rear axle assembly 14.

The frame 12 also includes left and right, downwardly sloping upper frame tubes 21 which extend from a handle 22 in converging configuration to the horizontal base frame tubes 20 at a position rearward of the front wheel 52 of the front wheel support structure 32. The forward ends of the upper frame tube 21 are releasably coupled to the horizontal base frame tubes 20 by left and right frame connectors 25 to permit folding of the stroller 10. The handle 22 is positioned at a height convenient for a user to push the stroller 10.

The frame 12 further includes left and right upright support tubes 24 extending between the rear axle assembly 14 and the upper frame tubes 21 at a position below and forward of the handle 22. The upright support tubes 24 are pivotally connected to the upper frame tubes 21 by left and right pivot joints 26, and fixedly connected to the axle assembly 14 by couplers 40, that permit folding of the stroller 10 when the frame connectors 25 are released to free the forward ends of the upper frame tubes from the horizontal base frame tubes 20.

Figure 4:
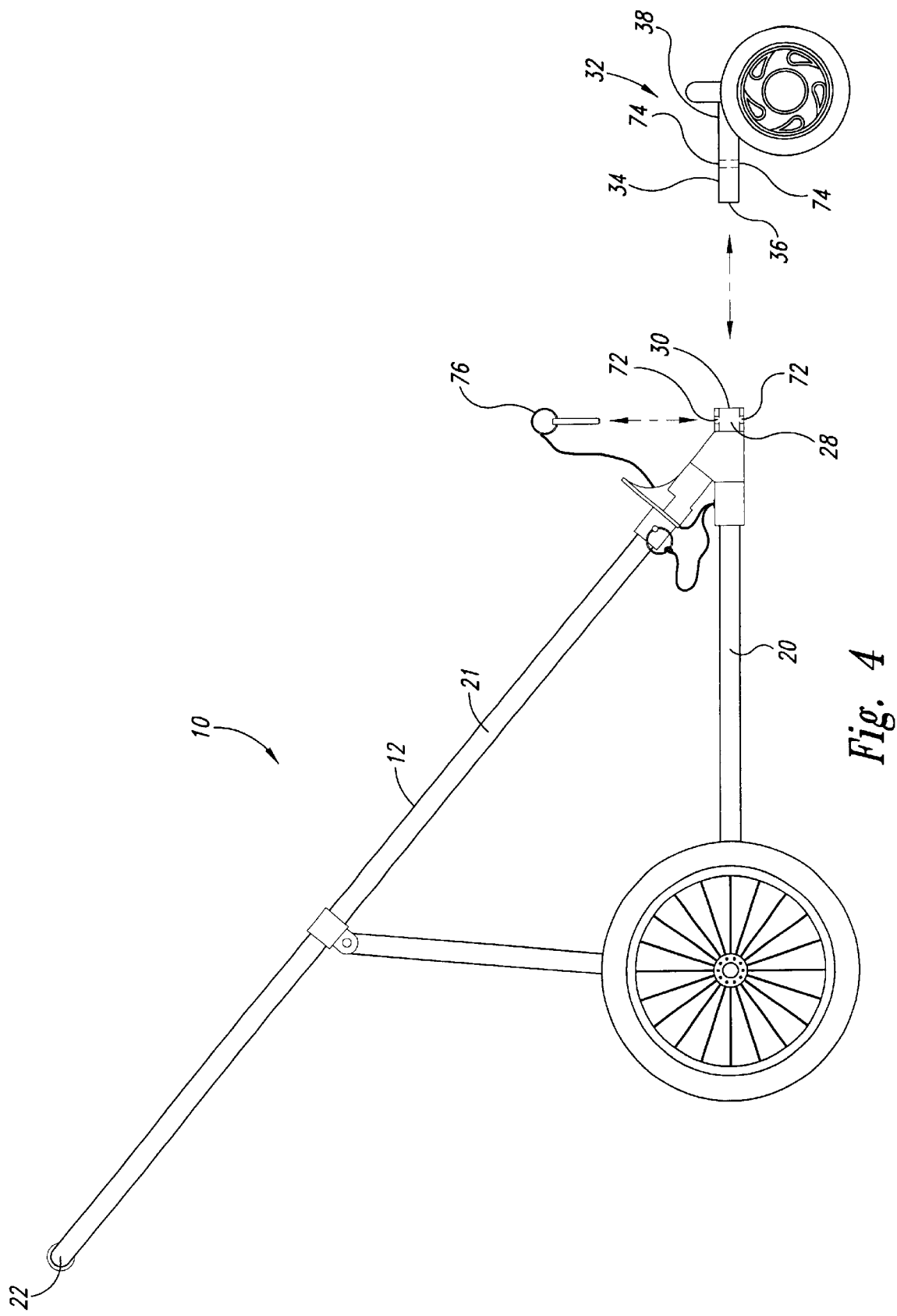
FIG. 4 is an enlarged side elevational view of the baby stroller of FIG. 1 showing the dual swivel assembly structure detached from the baby stroller frame.
Figure 5:
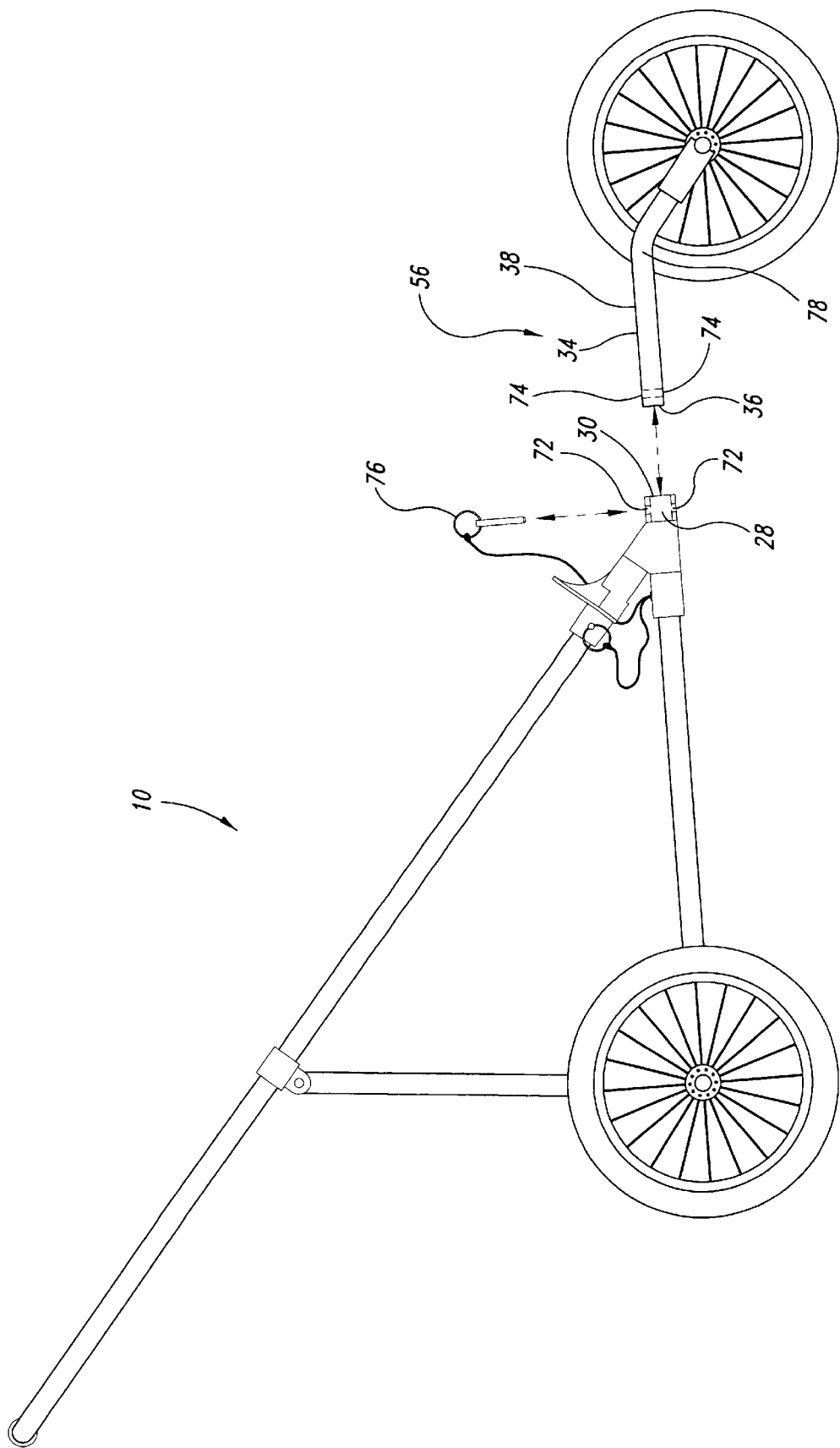
FIG. 5 is an enlarged side elevational view of the baby stroller of FIG. 1 with the dual swivel assembly removed and the single wheel support structure of FIG. 3 detached from the baby stroller frame, but in aligned position for attachment.

As best shown in FIGS. 2, 4, and 5, each horizontal base frame tube 20 has a tubular sidewall having a circular cross-section, with a circumferential outside wall surface extending axially to define the outside surface of the frame tube, and a circumferential inside wall surface defining therewithin an axially extending cylindrical interior chamber 28. The cylindrical interior chambers 28 of the left and right side horizontal base frame tubes 20 each have an opening 30 at the end of the tube facing outward away from the front of the stroller 10.

In the illustrated embodiment of the invention, there are a plurality of interchangeable front wheel support structures differing in configuration, using one or a plurality of front wheels of differing size, construction, and operation. The various configurations are combined to provide optimum balance between performance, stability, maneuverability, and portability for different types of travel and terrain for which the stroller 10 is used. In the illustrated embodiment, there are two front wheel support structures, a dual swivel wheel support structure as shown in FIG. 2, and a single wheel support structure with a parallel shaft arrangement as shown in FIG. 3. As best seen in FIGS. 2, 3, 4, and 5, both wheel support structures have left and right side mating portions 34. The mating portions 34 each have a tubular sidewall having a circular cross-section, with a circumferential outside wall surface extending axially from an insertion end 36 to a forward end 38, and thereby defining the outside surface of the mating portion. The mating portions are held in parallel arrangement and are spaced apart to align coaxially with the openings 30 of the interior chamber 28 of the base frame tubes 20 and the interior chambers themselves such that the insertion end of the left mating portion is aligned with the interior chamber opening of the left frame tube, and the insertion end of the right mating portion is aligned with the interior chamber opening of the right frame tube. The mating portions 34 are sized in diameter to slidably and snugly fit within the corresponding ones of the interior chambers 28 of the base frame tubes with the outside wall surface of the mating portions contacting the inside wall surface of the base frame tubes. This mating portion and base frame assembly allows the front wheel support structures 32 to be releasably, but securely attached to the base frame tubes 20 without the need for any additional attachment members added to the tubular base frame itself, thus minimizing frame weight and size. When the front wheel support structures 32 are removed from the base frame tubes 20, the overall size of the stroller 10 is significantly smaller than when attached, thus increasing the portability of the unit. Various types of terrain may be encountered commonly in everyday use of the stroller, such as going from the aisles of a supermarket to jogging on a grassy surface. As such, the present invention solves the problems encountered in not having a single stroller suitable for various terrain.

A releasable locking mechanism is used to secure the front wheel structures 32 to the base frame tubes 20 when inserted therein. In the illustrated embodiment, as best seen in FIGS. 4 and 5, the locking mechanism includes opposing first and second holes 72 in each of the left and right side base frame tubes 20. The first and second holes 72 extend fully through the tubular sidewall of the base frame tubes, along a diameter thereof, transverse to the axis of the base frame tube. Thus, the first and second holes of each base frame tube are diametrically opposed and also open on the outside wall surface as well as the inside wall surface of the interior chamber 28. Each of the mating portions 34 of each of the front wheel support structures 32 also includes opposing first and second holes 74. The first and second holes 74 extend fully through the tubular sidewall of the mating portions 34 along a diameter thereof, transverse to the axis of the mating portion. Thus, the first and second holes of each mating portion are diametrically opposed and also open on the outside wall surface thereof as well as an inside wall surface thereof. The holes 72 of the base frame tubes and the holes 74 of the mating portions are located and oriented such that when the insertion ends 36 of the mating portions 34 are fully inserted into the interior chambers 28 of the tubular base frame tubes 20, the holes of the corresponding ones of the mating portion and base frame tube coaxially align. The holes 72 and 74 are sized to receive a removable locking pin 76, the locking pin being configured to slidably fit through the holes.

FIG. 2 shows the dual swivel wheel support structure 32 utilizing a yoke that has left and right side swivel assemblies 42, each with a pivot arm 44. Each pivot arm 44 has a tubular sidewall having a circular cross-section, with a circumferential outside wall surface extending axially and vertically upward from a bottom end 46 of the pivot arm, then turning through a right angle and thereafter extending along a horizontal axis. The left and right side pivot arms 44 have their horizontally extending portions joined together at location 48. As can be seen in FIGS. 2 and 2a, each bottom end 46 of the pivot arms 44 is inserted axially into a substantially cylindrical wheel mount 43, along the axis of the wheel mount of a wheel assembly, and is fixable attached to the wheel mount with a rivet. Each wheel mount is inserted into a sleeve 50, and the sleeve is rotatably attached to the wheel mount 43 to freely rotate about a vertical axis of the pivot arm 44. A pair of wheels 52 are rotatably supported by each sleeve 50. The sleeve thus allows the pair of wheels 50 to swivel about the vertical axis of the pivot arm 44. The yoke also includes a cross bar 54 with a left end fixedly attached to the left pivot arm and a right end fixedly attached to the right pivot arm. The left and right mating portions 34 of the front wheel support structure 32 are fixedly attached to the cross bar in parallel, spaced apart arrangement so as to align with the base frame tubes 20, as described above.

In the illustrated embodiment, best shown in FIG. 2a, the swivel assemblies 42 each have a manually operable, quick release locking mechanism 51 to selectively lock the swivel assembly against swiveling. When the locking mechanism 51 is engaged, the sleeve 50 is prevented from rotating around the pivot arm, thereby preventing the wheels from swiveling and holding the pair of wheels 51 in alignment with the rear wheels 16 so the stroller 10 tracks a straight line better when moved forward. Thus, when it is desired to travel substantially in a straight line, the locking mechanism 51 can be used to maintain the wheels in a static alignment. The locking mechanism 51 can also be used to help stabilize the stroller when parked, preventing lateral tolling movement of the front of the stroller.

As best seen in FIG. 3, the single wheel support structure 32 uses a parallel shaft assembly. The parallel shaft assembly has left and right side tubular shafts 60, each with a tubular sidewall having a circular cross-section, with a circumferential outside wall surface extended axially from a first end portion 62 to a second end portion 64, and thereby defining the outside surface of the tubular shaft. The first end portion 62 of each tubular shaft 60 is inserted in and fixedly attached to a fork tip 63 with a rivet. The left and right side tubular shafts 60 are in parallel spaced-apart relation to each other along their lengths, with the fork tips 63 of the tubular shafts having slots to releasably receive and retain the corresponding one of the left and right ends 68 of a spindle 66 of the single front wheel 52. In conventional fashion, the spindle 66 is removably threaded through a wheel hub 70 of the wheel 52, so that the wheel rotates about the spindle.

The second end portion 64 of the left and right shafts 60 form the left and right mating portions 34 of the parallel shaft assembly 56 and are spaced and arranged for insertion into the base frame tubes 20, as described above.

The left and right side tubular shafts 60 of the parallel shaft assembly 56 preferably includes a gradual bend at the location 78 of each shaft. The bend is positioned midway between the first end portion 62 and the second end portion 64 with the bend defining an angle between the first and second end portions 62 and 64 such that when the left and right tubular shafts 60 are mated to the stroller frame 12, an open end of the slot of the fork tip 63 is positioned vertically below a closed end of the slot so that the spindle 66 is better maintained in the slots during use of the stroller 10.

The wheels 52 of the dual swivel wheel assembly structures are typically smaller and of different configuration than the wheel 52 of the parallel shaft assembly 56. The smaller wheels and swivel assemblies 42 are suited for smooth terrain requiring a tight turning radius where travel is at slower speeds. In contrast, the larger wheel of the single wheel support structure is suited for more rigorous terrain, where travel speed is higher and the typical turning radius used is larger. These types of varying terrain may be encountered commonly in everyday use of the stroller, such as going from the aisles of a supermarket to jogging on a grassy surface. As such, the present invention solves the problems encountered in not having a single stroller suitable for various terrain.

In addition to providing various operating advantages, the interchangeable wheel support structure also adds to portability and storage flexibility by allowing detachment of the front wheel portion of the stroller when necessary.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A baby stroller comprising:
   a frame having a frame attachment member;
   at least one rear wheel rotatably mounted to the frame; and
   a plurality of interchangeable front wheel support structures each of the plurality of interchangeable front wheel support structures including at least one front wheel rotatably attached thereto, and a wheel support structure attachment member configured to releasably attach to the frame attachment member wherein first and second ones of the plurality of interchangeable front wheel support structures include different configurations of the at least one front wheel attached thereto to provide the first and second interchangeable front wheel support structures with alternative front wheel configurations selectable for particular terrain over which the baby stroller is to be used.

2. The baby stroller of claim 1 wherein the plurality of interchangeable front wheel support structures comprise at least one swivel assembly having the at least one front wheel rotatably attached to the swivel assembly, the swivel assembly configured to permit the at least one front wheel to swivel about an axis transverse to an axis of rotation of the at least one front wheel.

3. The baby stroller of claim 1 further comprising a locking mechanism to releasably secure the Wheel support structure attachment member to the frame attachment member.

4. A baby stroller comprising:
   a frame having a frame attachment member;
   at least one rear wheel rotatably mounted to the frame; and
   a plurality of interchangeable front wheel support structures each of the plurality of interchangeable front wheel support structures including at least one front wheel rotatably attached thereto, and a wheel support Structure attachment member configured to releasably attach to the frame attachment member, wherein the plurality of interchangeable front wheel support structures comprise at least one swivel assembly having the at least one front wheel rotatably attached to the swivel assembly, the swivel assembly configured to permit the at least one front wheel to swivel about an axis transverse to an axis of rotation of the at least one front wheel and wherein the plurality of interchangeable front wheel support structures further comprise at least one single front wheel support assembly with the assembly being configured to maintain the single front wheel in substantial static alignment during use, the single front wheel being larger in diameter than the at least one front wheel of the swivel assembly.

5. A baby stroller comprising:
   frame having a frame attachment member;
   at least one rear wheel rotatably mounted to the frame; and
   a plurality of interchangeable front wheel support structures each of the plurality of interchangeable front wheel support structures including at least one front wheel rotatably attached thereto, and a wheel support structure attachment member configured to releasably attach to the frame attachment member wherein a first one of the plurality of interchangeable front wheel support structures has no more than one front wheel and a second of the plurality of interchangeable front wheel support structures includes a plurality of wheels.

6. A baby stroller comprising:

a frame having a left frame member and a right frame member, each frame member having a first end portion and a second end portion, the first end portion positioned at a front of the frame and the second end portion positioned rearward of the first end portion, the first end portions of the left and right frame members being spaced apart relative to one another;

at least one rear wheel rotatably mounted to the frame, a plurality of interchangeable front wheel support structures, each comprising a left mating portion and a right mating portion, the left and right mating portions being spaced apart by an amount corresponding to the spacing between the first end portions of the left and right frame members so that the left mating portion is aligned with the first end portion of the left frame member and the right mating portion is aligned with the first end portion of the right frame member, the left and right mating portions being configured to releasably attach to the corresponding first end portions of the left and right frame members; and at least one front wheel rotatably attached to each of the plurality of interchangeable front wheel support structures.

7. The baby stroller of claim 6 wherein first and second ones of the plurality of interchangeable front wheel support structures comprise differing first and second wheel support configurations to which the at least one front wheel is attached, and the at least one front wheel of each of the first and second wheel support structures has a different wheel configuration from the at least one front wheel of the other of the first and second wheel support structures, the wheel support configurations and wheel configurations being selectable for a particular terrain over which the baby stroller is to be used.

8. The baby stroller of claim 6 wherein a first one of the plurality of interchangeable front wheel support structures has no more than one front wheel and a second of the plurality of interchangeable front wheel support structures includes a plurality of wheels.

9. A baby stroller comprising:

a tubular frame having a left frame tube and right frame tube, each frame tube having a forward end portion with a circumferential outside wall extending axially to define the outside surface of the frame tube, and a circumferential sidewall defining therewithin an axially extending cylindrical interior chamber, the cylindrical interior chamber having an opening facing outward away from a front of the baby stroller, the forward end portions of the left and right frame tubes being spaced apart and an axis of the forward end portions of the left and right frame tubes being positioned substantially in parallel relation to the other;

at least one rear wheel rotatably mounted to the frame;

a plurality of interchangeable front wheel support structures, each comprising a left mating portion and a right mating portion, each mating portion having a circular cross-section with an insertion end portion and a outward end portion, a circumferential outside wall extending axially from the insertion end portion to the outward end portion thereby defining an outside surface of the mating portion, the insertion end portions of the mating portions being positioned in substantially parallel relation to each other and spaced apart in relation to the left and right frame tubes such that the insertion end portion of the left mating portion is aligned with the interior chamber opening of the left frame tube, and the insertion end portion of the right mating portion is aligned with the interior chamber opening of the right frame tube, each of the insertion end portions of the mating portions being sized in diameter to slidably and snugly fit within the interior chamber of the corresponding one of the left and right frame tubes;

at least one front wheel rotatably attached to each of the plurality of interchangeable front wheel support structures; and a releasable locking device configured to lock the insertion end portions of the mating portions of the interchangeable front wheel support structures in position within the interior chambers of the corresponding left and right frame tubes when the insertion end portions of the mating portions are positioned within the interior chambers.

10. The baby stroller of claim 9 wherein the plurality of interchangeable front wheel support structures comprise at least one wheel structure having a left swivel assembly and right swivel assembly.

11. The baby stroller of claim 9 wherein the plurality of interchangeable front wheel support structures comprise at least one parallel shaft assembly having a left shaft and a right shaft configured so that a wheel can be rotatably mounted between the shafts.

12. The wheel assembly of claim 11 wherein the parallel shaft assembly further comprises a gradual bend in each of the shafts, the bend being about halfway between the first end portion and the second end portion of the shaft.

13. The wheel assembly of claim 9 wherein the releasable locking device comprises:

a first hole and an opposing second hole on each of the frame tubes and a first hole and an opposing second hole on each of the mating portions of the plurality of interchangeable wheel support structures, all of the holes heretofore described being positioned to align when the insertion ends of the mating portions are inserted into the interior chambers of the frame tubes, the holes being sized to receive a removable locking pin, the locking pin being configure to slidably fit through the holes.

* * * * *